UNITED STATES PATENT OFFICE.

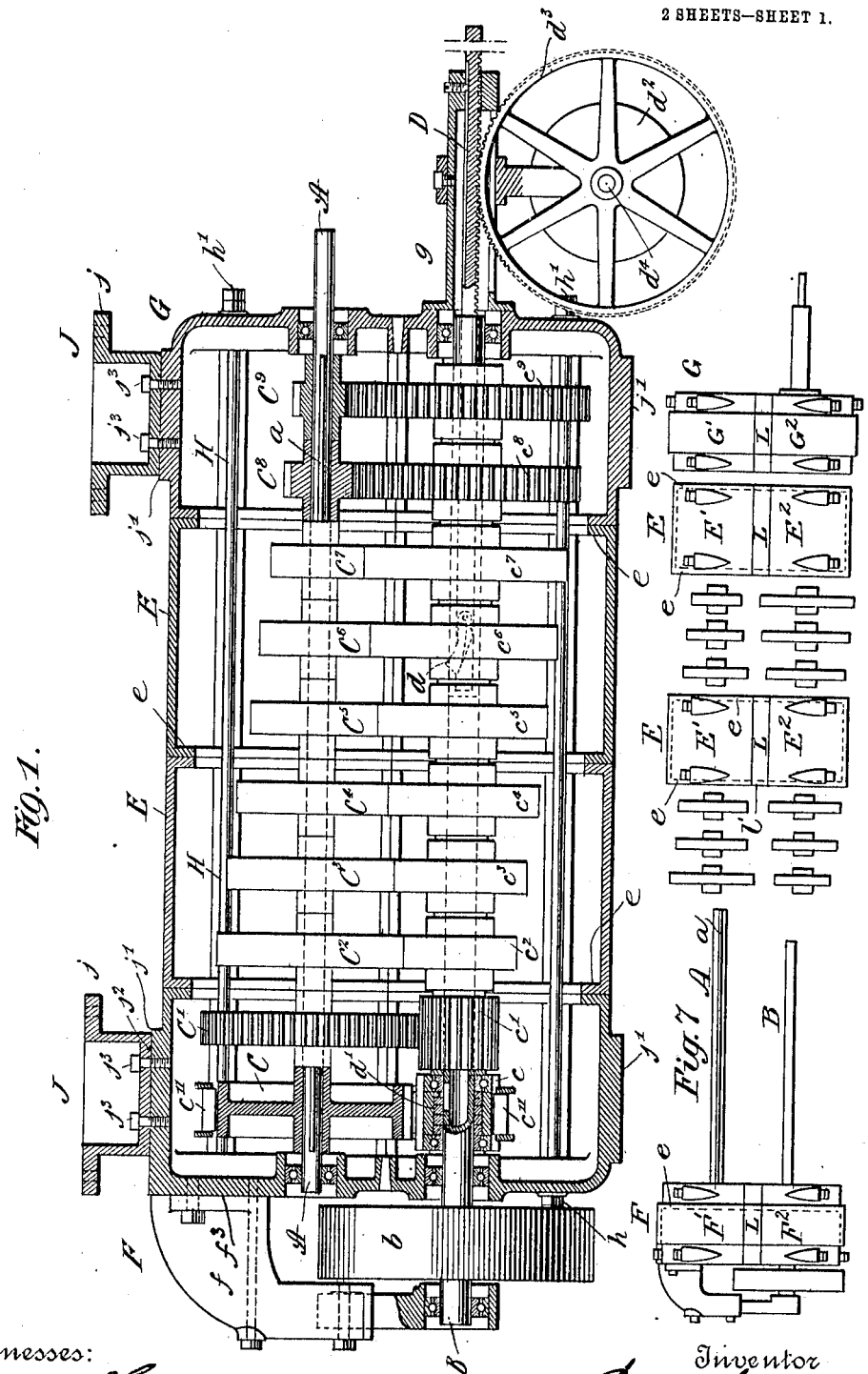

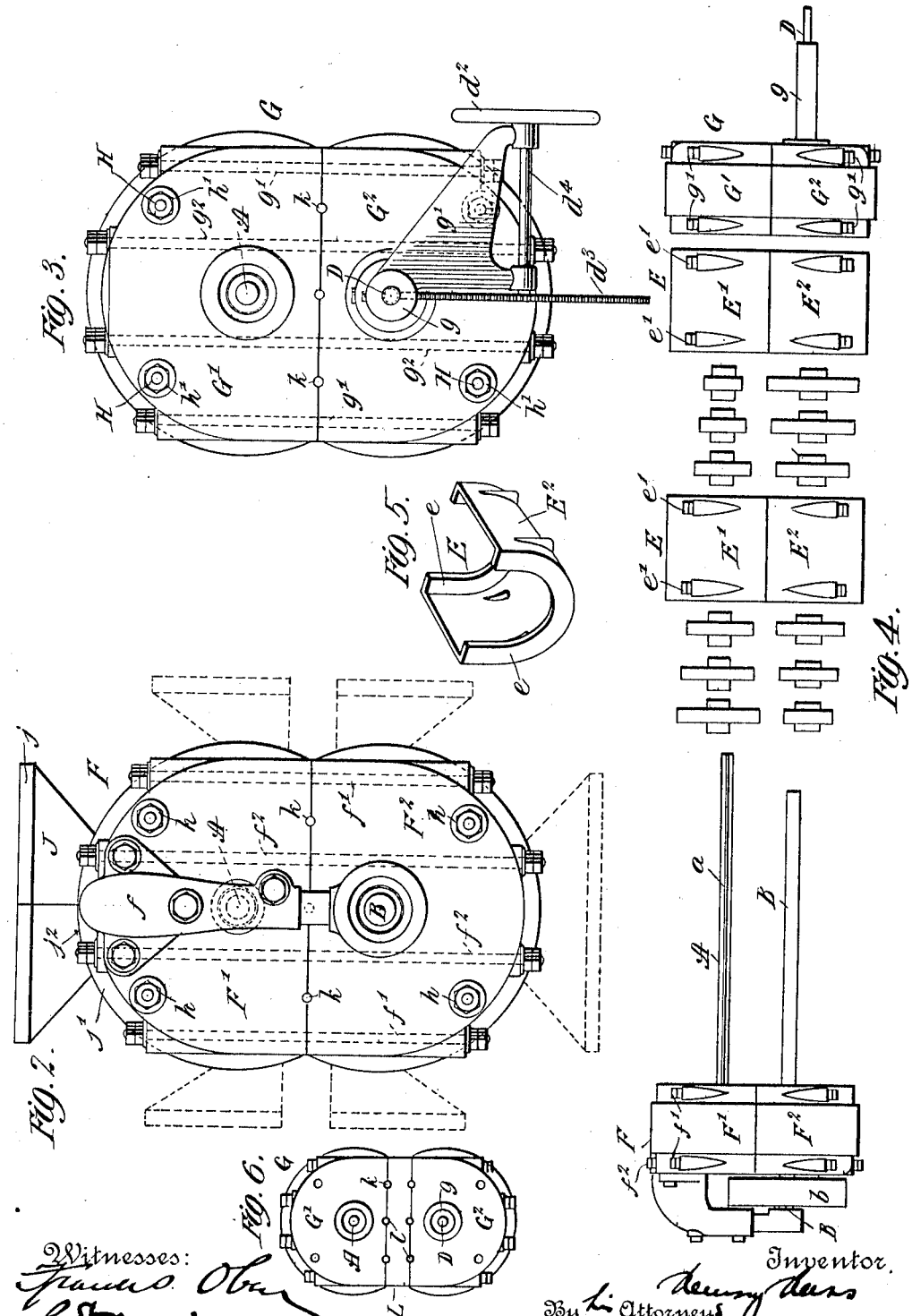

HENRY HESS, OF PHILADELPHIA, PENNSYLVANIA.

CHANGE-GEAR MECHANISM.

1,020,095. Specification of Letters Patent. Patented Mar. 12, 1912.

Application filed March 24, 1911. Serial No. 616,738.

*To all whom it may concern:*

Be it known that I, HENRY HESS, a citizen of the United States, residing at Philadelphia, in the county of Philadelphia and State of Pennsylvania, have invented certain new and useful Improvements in Change-Gear Mechanism, of which the following is a specification, reference being had therein to the accompanying drawing.

My invention relates to a change gear mechanism or what is sometimes termed variable speed gearing such as is used in various mechanical situations, sometimes, for example, upon machine tools or metal working machines of which the milling machine may be referred to as an instance.

In mechanism of this class the problem is one of motion transmission, for example from a driving to a driven shaft with such control as to permit the relative speeds of the shafts to be changed; thus the driving shaft may be steadily driven by power and the driven shaft may be caused to rotate at a greater or less speed according to the nature of the particular work to be done on the milling or other machine. Together with the driving and driven shafts in a change gear mechanism will be used a selective or shiftable keying or locking device for causing any one of a number of gear-sets to be put into action intermediate of the two shafts so that the driven shaft speed will be in accordance with the proportions of the gear-set.

Change gears of the kind thus described are well known and an example is indicated as a part of the milling machine illustrated in U. S. Letters Patent No. 970,330, granted to me Sept. 13, 1910, in view of which the coöperative action of the gear-sets and the driving and driven shafts and the selective locking device will be understood and will not require to be described in any complete detail herein.

It is well known that there are many different specific uses made of change gear mechanisms requiring them to be of great diversity in size, operation, etc.; for example the number of different ratios required in a given change gear mechanism, the specific ratios to be comprised therein, the length or size of the mechanism and its mode of attachment to the machine in connection with which it is to be used, will vary exceedingly between certain practical limits.

It is an object of the present invention to effect an important economy in the designing and constructing of change gear mechanisms by dispensing with the need of providing a special design and therefore special plans, patterns and castings for each mechanism, and this object is accomplished by the present invention by enabling one to keep in stock a comparatively small variety of parts capable of assemblage so as to make up the desired combination of parts and thus provide a change gear mechanism adapted for any given work to be performed. This is enabled because substantially all change gears, whatever the diversity of their work, have much in common. The expense of furnishing a change gear mechanism for any given service is thereby so far reduced as to constitute a most important and desirable factor, due to the component parts being manufactured in very much larger quantities.

To carry out the above referred to object, the present invention comprises an extensible case or casing in the nature of a housing, made up of a plurality of identical—meaning substantially interchangeable—case units with and within which are associated the driving and driven shafts, the different gear-sets intermediate the shafts and the selective means of putting the gear-sets into action.

Further and more specifically stated objects, and the features of this invention for effecting them, will more fully appear and be set forth in the following detail description.

I will first describe one form of change gear mechanism embodying the present improvements and will then point out the novel features in the claims.

In the accompanying drawings forming a part hereof, Figure 1 is a central vertical cross-section in which many of the interior parts appear in front elevation. Fig. 2 is a left end elevation, and Fig. 3 a right end elevation of the apparatus seen in Fig. 1. Fig. 4 is a front elevation of the same with the parts, however, segregated or in the process of assemblage so as to more clearly disclose the manner in which the casing and the change gear mechanism as a whole are made up. Fig. 5 is a perspective view of an intermediate half unit. Fig. 6 is a right end view with an insertion enlarging the center distance between shafts. Fig. 7 is a view similar to that of Fig. 4 and combining with the elements of Fig. 4 the additional features shown in Figs. 5 and 6.

Similar letters of reference designate corresponding parts in the several figures of the drawings.

In the illustrated form of embodiment, the change gear mechanism includes the following assembled elements, namely the housing or case with the characteristics referred to, driving and driven shafts, a number of selectable gear-sets, each one of which may differ from the others not only as to ratios but as to its type, whether it be directly geared, connected by chain, or merely an idler, a selective keying or locking device, bolts binding the whole together, and means enabling the whole to be secured in different ways to the machine tools or the like.

I have not shown the invention applied to a machine tool, but would state that it would preferably be introduced into that part of the train of mechanism of the machine tool which would avoid an overstrain of the change gear mechanism; thus where much power has to be transmitted the change gear mechanism would be introduced in the high speed end of the train where the tooth loads would be comparatively low.

In the drawings the driving shaft A may be said to extend longitudinally and will preferably be paralleled by the driven shaft B. The former at its right-hand end will be connected in any desirable way to a source of power and the latter will become the source of movement for the operative mechanism of the metal working or other machine. The driven shaft B is shown as provided with a pulley $b$ which may actuate a belt that serves to connect it with some part of the mechanism of the machine.

Intermediate the driving and driven shafts are a number of gear-sets, and the number thereof may be varied in the use of my invention. Ten gear-sets are shown, each of them operatively connected to both the driving and driven shafts as by means of gear or sprocket wheels on said shafts. The first or left-hand gear-set comprises a toothed sprocket or gear C on the driving shaft, and a corresponding one $c$ on the driven shaft, the two operatively connected at all times by a chain or sprocket $c^{11}$, this type of chain gear-set being well known and used in connection with a series of direct gear-sets for the purpose of permitting a reversal of motion.

The second gear-set comprises a driving gear C' and a driven gear $c'$, mounted respectively on the driving and driven shafts, and the remaining gear-sets illustrated comprise driving gears $C^2$ to $C^9$ inclusive, and driven gears $c^2$ to $c^9$ inclusive respectively. The gears C' to $C^9$ are directly geared to the gears $c'$ to $c^9$, the former being of graduated diameters and the latter also graduated but in the inverse order as shown, thus preserving a uniform center distance between the gears' centers and affording various gear ratios as may be required by the work. It will be understood that the ratios of the several gear-sets will be calculated for whatever speed proportions are desired for the given metal working or other machine.

As is usual I prefer that the several driving gears C to $C^9$ inclusive shall be fast upon, so as to be compelled to drive with, the driving shaft A, whereas the respective driven gears $c$ to $c^9$ are loose upon the driven shafts but adapted to be selectively keyed or locked to the driven shaft so that the latter shaft will be driven in accordance with the ratio of the gear-set that includes the locked gear. A key $a$ is shown on the driving shaft serving to permanently lock all of the driving gears thereto. The different gear-sets may be rendered selectable by any desired selective devices, several forms of which are well known, but I have shown a device in which the driven shaft has no endwise movement but is hollow so as to receive a sliding member carrying a spline or key which may be pulled or pushed to any desired position so that it may cause the driven shaft to be keyed or locked to any one of the gears thereon. This type of selective device is illustrated in Patent No. 970,330 before referred to, to which reference is made for complete details. In the drawings hereof the slide D is capable of being pushed into or out of the hollow driven shaft, carrying with it the pivoted spring pressed spline or key $d$ shown in dotted lines in Fig. 1 as in a position to lock the driven gear $c^6$ to the shaft. The leftmost gear-set is shown in section, and this indicates the details of the selective mechanism. A slot in the driven shaft B permits the spring pressed key $d$ to pass through and project from the shaft into engagement with the free end of a coil spring $d'$ whose fixed end is secured in the hub of the gear or sprocket wheel $c$. When the driving shaft A is in rotation the driven gears including $c$ will all be constantly rotating, the effect of which is that the coil spring $d'$ is caused to contract and tighten itself upon the driven shaft B giving such engagement as to compel the latter to rotate with the gear $c$. A hand wheel $d^2$ may be employed for adjusting the slide D by pushing or pulling it to the proper position, said slide having teeth along one side engaging the teeth of the gear $d^3$ mounted on a short shaft $d^4$ to which the hand wheel $d^2$ is also secured, so that rotation of the hand wheel effects co-action between the gear and rack and causes the sliding of the slide D.

The case or housing of the present invention includes one or more, and in fact any desired number, of intermediate case units E, all of which are mechanically speaking identical with each other or interchangeable, and also capable of being engaged or fitted one with the other so as to permit indefinite extension of the case or housing. These intermediate case units are not shown as containing bearings for shafts or other working parts, and indeed the driving and driven shafts as indicated have their bearings at their respective ends, each of said shafts being sufficiently long to accommodate all of the gear-sets so that the two shafts are common to all of the gear-sets of my change gear mechanism. While the shafts might have their bearings directly in the frame of the metal working or other machine, which frame might also be recessed to accommodate one or more of the gear-sets of the series, I prefer and have indicated the employment of predesigned end units F and G, the four units F, E, E and G of Fig. 1 with the mechanism contained with them constituting a complete change gear mechanism. The left end section F is shown as having an extension $f$ which affords an additional bearing for the driven shaft, the pulley $b$ being located between the extension $f$ and the end unit F. The right end unit G may have an extension $g$ with an offset $g'$ for properly supporting the hand wheel $d^2$ and spline adjusting gear $d^3$.

As shown each of the end units F, G is constructed to accommodate one or more gear-sets, and one of them F contains the gear-set C, $c$ constituting the reverse gear-set for the purpose of reversing the direction of the driven shaft. Each of the intermediate units E is shown as accommodating an integral plural number of gear-sets, namely three. The different units are shown as joined to each other at planes transverse to the driving and driven shafts.

It will be understood that the units E since they are shown non-interchangeable with the end units F, G, may in all instances be properly distinguished and designated by the term "intermediate case units;" that is to say, they are intermediate of whatever supporting or shaft bearing means or fittings may be employed at the two ends, examples of which are the illustrated end units. The term "intermediate case units" therefore implies any sort of end supports or fittings.

Means for securing the whole together into an entirety is shown in the form of longitudinal bolts or rods H having heads $h$ and nuts $h'$, said bolts adapted to be passed through from one end to the other and be tightened upon the end units so as to compress all of the parts firmly, rigidly and permanently together; and each of the intermediate units may be so designed that the bolts H will coöperate with them to prevent their lateral displacement, although in most cases they will be sufficiently securely held merely by the great pressure of one against the other.

I will now describe the constructing or making up of a complete change gear mechanism from its component parts in accordance with my invention, so as to more clearly indicate the extensibility of the mechanism. The different component parts will be carried in stock, there being comparatively few kinds of parts. Thus the intermediate units E are all identical and one stock design serves for them, so that a mechanism can be built up with such stock parts, whether there be one, two, three or more required to organize the desired combination. The end units F, G are shown as identical, they having the extensions $f$ and $g$ attached to them by bolts, screws or the like. Gear-sets will of course have to be kept in stock of all possible desired ratios, each gear-set or gear-pair having the requisite center distance to enable it to coöperate with the driving and driven shafts A, B. The gears of the gear-sets preferably have hubs as shown, and the proportions of the different parts are such that each case unit or housing, whether an end unit or an intermediate unit, accommodates an integral number, namely two in the end units and three in the intermediate units, of gear-sets. Besides the end and intermediate units and the gear-sets, there will of course be kept in stock shafting, binding bolts and the end fixtures $f$, $g$ and their concomitants for example of the forms shown in the figures.

Suppose for a given metal working machine the call is made for a change gear mechanism to have a certain number of ratios, such as nine direct ratios and a reverse, or any other number, the change gear mechanism will then be constructed or made up substantially as follows. Out of stock will be selected the gear-sets according to the ratios called for, in this case nine direct gear-sets and one reserve. Remembering that the end case units accommodate one or more, in this case two, gear-sets, then sufficient intermediate units will be taken to accommodate the remainder, namely six gear-sets, which with the proportions indicated will require two intermediate units. Shafting and binding bolts will be taken and cut off if necessary so as to be of the proper length for a combination of two end and two intermediate units. The driven shaft may then be connected up to the left-hand end unit and secured in proper coöperation with the pulley $b$, extension $f$, etc. Then turning the parts around vertically if desired, the further assembling will be as clearly indicated in Fig. 4. First three of the gear-sets will be strung upon the respective shafts A, B. An intermediate housing or case unit E will then be slipped over, it serving to inclose or accommodate the three gear-sets previously applied. Three further gear-sets will then be applied, another intermediate case unit E, and thereafter any further gear-sets and case units according to the demands. Finally the end case unit G and the gear-sets it is to inclose will be fitted at the end leaving the driving shaft A sufficiently projecting at the end. The connecting or binding bolts will then be passed longitudinally through, the end units having already been pre-arranged with holes to accommodate them, and the binding nuts $h'$ will be securely tightened into place. The fitting of the selective device and hand wheel will then be easily accomplished and the change gear mechanism is complete.

The present invention is shown as carried farther than above described by the division of each of the end and intermediate units into two or more identical fractional or half units, which in one sense may be considered as the ultimate units employed to build up the entire mechanism. Thus the end unit F is divided into two half units $F'$ and $F^2$, these being identical or interchangeable and being adapted to be securely bolted together by bolts $f'$ and further bolts $f^2$ if desired. The same is true of the end unit G, its halves $G'$, $G^2$ being connected by bolts $g'$, $g^2$. The intermediate sections E which are flanged at $e$ to secure greater efficacy in holding them in place, are indicated in Fig. 4 as divided into half units $E'$ and $E^2$ connected by bolts $e'$. The different bolts $f'$, $g'$, $e'$ are externally disposed so as to keep the interior clear and afford greater facility in assemblage. The division of the different units into half units effects important economies in their manufacture and gives greater facility in the making up and assemblage. The intermediate half units will all be identical and interchangeable and the four end half units may also be identical and interchangeable, but I prefer that the end half unit $F'$ be kept in stock of a slightly different form affording a flat face $f^3$ that may be easily machined off for the better reception of the base of the extension $f$.

In association with the main features of my invention above described, the following attaching means coöperates in an important manner. Attaching feet J are employed which are shiftable or securable at any peripheral point on the change gear mechanism, preferably on the periphery of the end units, and said feet have attaching flanges $j'$ whereby they may be attached to the metal working or other machine at any convenient point thereof. This desirable result is shown as attained by providing each of the end sections with a circular periphery, or one constituted of arcs of circles, and constructing also the feet J with correspondingly curved surfaces for contacting the circular peripheries of the end sections. Thus at $j'$ is indicated the circular periphery of an end section, and at $j^2$ the curved surface of the foot J adapted to contact therewith, and there being bolts, screws or the like $j^3$ for securing the feet to the casing. By this arrangement the feet J may be attached at substantially any peripheral point in accordance with the situation in which the change gear mechanism has to be employed, and in Fig. 2 are indicated a number of possible positions for the attaching feet, any one or two or more of which may be made use of at the same time, the feet being identical or interchangeable.

The several half units contemplated in my invention, while shown as having circular peripheries, are not shown as constituting exact semi-circles, but as seen in Figs. 2 and 3, each of them is considerably more than a semi-circle, this affording a superior shape for the accommodation of the shafts and the gears, and also increasing the strength of the mechanism by affording a greater resistance to collapse.

An insertion L is shown in Fig. 6 for enlarging the center distance between shafts A and B to accommodate larger sets of gears. In the main figures of the drawings pins $k$ are shown for determining and maintaining the adjustment of one half unit to another, and when insertion L is used it may be recessed on opposite sides at $l$ as shown, so as to accommodate two sets of pins $k$ instead of the single set as shown in the main figures.

Fig. 7 is a view similar to Fig. 4, it showing substantially all of the component parts in a position preparatory to their assemblage, and in this figure will be seen designated by letter the several insertions L between the several pairs of half units which are for the purpose of enlarging the center distance between the shafts A and B, as explained in the previous paragraph above. Fig. 7 also shows in dotted lines the internal flanges $e$ formed on each half unit and similar flanges $l'$ formed on each insertion L.

It will be seen that by reason of the construction including the designs and arrangements above shown and described, a change gear mechanism is provided which answers the objects and affords the advantages of the invention as hereinbefore set forth, and other advantages will be apparent to those skilled in the art.

It is to be understood that the invention in its broader aspects is not limited to the precise construction shown nor to any particular construction by which the invention has been or may be carried into effect, since many changes may be made in the details of the parts without departing from the main principles of the invention and without sacrificing its chief advantages; and no limitations are intended except such as are set forth in the respective claims.

What I claim and desire to secure by Letters Patent is:

1. A change gear mechanism comprising an extensible case made up of components including a plurality of identical intermediate case units, in combination with driving and driven shafts, a number of gear-sets intermediate said shafts and a selective means of putting said gear-sets into locked relation to the shafts.

2. A change gear mechanism comprising a longitudinally extensible case made up of components including a plurality of identical intermediate case units joined to each other at planes transverse to the driving or driven shafts, in combination with driving and driven shafts, a number of gear-sets intermediate said shafts and a selective means of putting said gear-sets into locked relation to the shafts.

3. A change gear mechanism comprising a longitudinally extensible case made up of components including a plurality of identical intermediate case units joined to each other at planes transverse to the driving or driven shafts, in combination with driving and driven shafts, a number of gear-sets intermediate said shafts a selective means of putting said gear-sets into locked relation to the shafts; and longitudinal binding members securing the several case units together.

4. A change gear mechanism comprising in combination the driving and driven shafts, a number of gear-sets intermediate said shafts, a selective device, and an extensible case made up of components including identical intermediate case units surrounding said shafts and gear-sets, with means for securing the whole together.

5. A change gear mechanism comprising in combination the driving and driven shafts, a number of gear-sets intermediate said shafts, a selective device, and an extensible case made up of end case units having shaft bearings and identical intermediate case units surrounding said shafts and gear-sets, with means for securing the whole together.

6. A change gear mechanism comprising in combination driving and driven shafts, selectable gear-sets, and an extensible case made up of components including a plurality of identical intermediate case units.

7. A change gear mechanism comprising in combination driving and driven shafts, selectable gear-sets, and an extensible case made up of components including a plurality of identical intermediate case units, each unit corresponding in longitudinal dimension with a given number of the gear-sets.

8. A change gear mechanism comprising in combination driving and driven shafts, selectable gear-sets, and an extensible case made up of components including a plurality of identical intermediate case units, each unit being formed in two identical half units on a plane parallel to said shafts.

9. A change gear mechanism comprising in combination driving and driven shafts, selectable gear-sets, and an extensible case made up of components including a plurality of identical intermediate case units, each unit being formed in two identical half units on a plane parallel to said shafts, and enlargeable by insertion of a piece between said half units.

10. A change gear mechanism comprising in combination driving and driven shafts, selectable gear-sets, and an extensible case made up of a plurality of case units, each unit being formed in two identical half units on a plane parallel to said shafts.

11. A change gear mechanism comprising in combination driving and driven shafts, selectable gear-sets, and an extensible case made up of a plurality of case units, each unit being formed in two identical half units on a plane parallel to said shafts, and enlargeable by insertion of a piece between said half units.

12. A change gear mechanism comprising in combination driving and driven shafts, selectable gear-sets, and an extensible case made up of a plurality of case units, at least one of said units having a circular periphery, and curved attaching feet securable at any peripheral point for mounting the mechanism on a machine.

13. A change gear casing made up of components including a plurality of identical casing units, each unit consisting of a shell having provision for adjustment to the adjacent unit, and means for rigidly securing the whole together.

14. A change gear mechanism made up of components including a plurality of identical casing units, each unit consisting of a shell having an inward flange at each end, and bolts for securing the whole together.

15. A change gear mechanism made up of components including a plurality of identical casing units, each unit consisting of two or more identical fractional units, means for securing such fractional units together to form a unit, and other means for securing the units together.

16. A change gear mechanism made up of components including a plurality of identical casing units, each unit consisting of two identical half units and each half unit consisting of a shell forming a portion of a circle greater than a semi-circle, and means for securing all said half units and units together.

In testimony whereof I affix my signature in presence of two witnesses.

HENRY HESS.

Witnesses:
   THEO. H. M'CALLA,
   NETTIE L. HAHN.

Copies of this patent may be obtained for five cents each, by addressing the "Commissioner of Patents, Washington, D. C."